Oct. 13, 1953     A. W. KONCHAN     2,655,284
RADIATOR PRESSURE CAP
Filed March 15, 1951
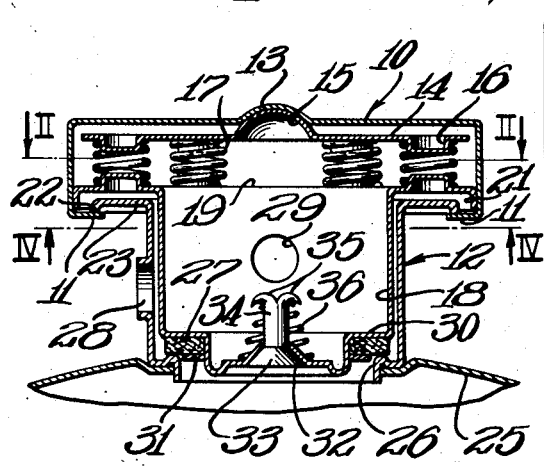
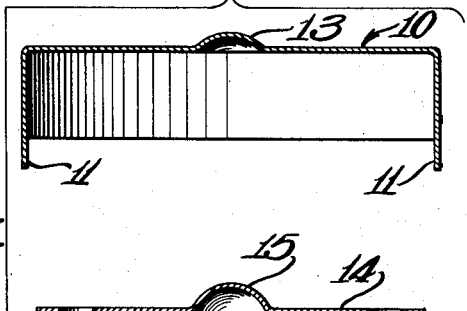
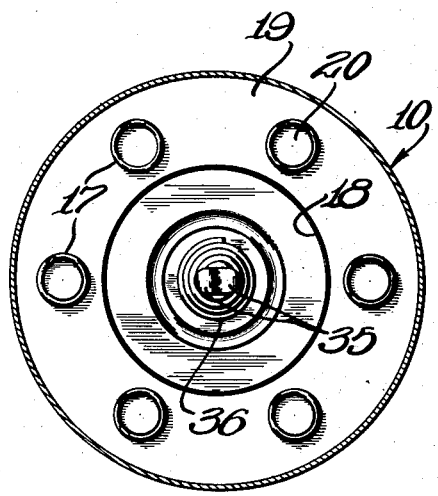
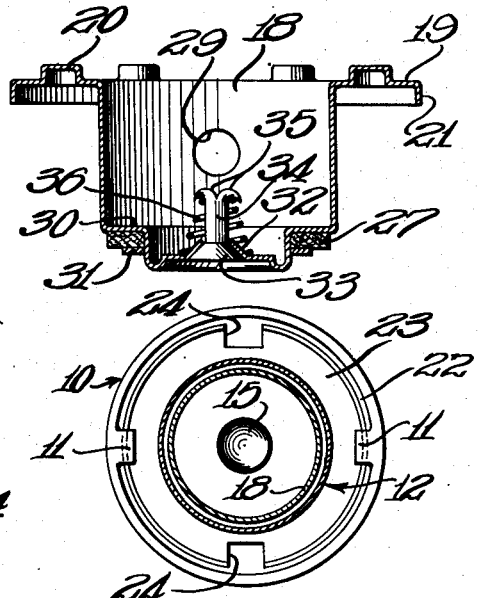
Inventor:
Anton W. Konchan Patented Oct. 13, 1953

2,655,284

UNITED STATES PATENT OFFICE 2,655,284

RADIATOR PRESSURE CAP

Anton W. Konchan, Berwyn, Ill.

Application March 15, 1951, Serial No. 215,795

5 Claims. (Cl. 220—44)

This invention relates to an automobile radiator cap and more particularly to a detachable self-locking cap having both pressure and vacuum relief valves embodied therein.

An object of this invention is to provide an improved pressure type radiator cap which lends itself to economical manufacture on a large production scale.

Another object of this invention is to provide a pressure type cap wherein the major cap parts may be made from simple metallic stampings.

Yet another object of this invention is to provide an improved pressure type radiator cap which is simple in construction and of a minimum of parts.

A further object of the invention is to provide a pressure cap assembly wherein the sealing gasket for engaging the edge of the neck filler opening of the radiator may be used as a movable pressure relief valve when the cap is locked to the neck.

In accordance with the general features of this invention there is provided in a radiator cap assembly including an outer cap body for detachable locking engagement with the radiator neck having a shoulder on its inner end defining a filler opening which also serves as a pressure relief valve opening, a hollow valve cage depending from and movably carried by the outer cap body for telescoping the radiator neck and comprising a dished shell with a turned annular bottom flange at its inner end defining at its center a vacuum relief valve opening and supporting a spring urged valve closure in the opening normally in closed position but automatically movable to open position in response to a vacuum in the radiator, the flange having its portion radially downward of the valve provided with a valve closure ring, independent of the relief valve, for yieldable and sealing cooperation with the neck shoulder to close the pressure relief valve when the cap body is locked to the neck; the valve closure ring when seated sealing the filler opening of the neck.

Another feature of the invention relates to the provision of a plurality of circumferentially spaced springs in the cap body above a depending valve cage and supported by an annular flange on the cage for yieldably urging the cage downwardly into sealing engagement with a shoulder on the inside of the radiator neck.

Yet another feature of the invention relates to the provision, in a radiator cap body, of a spring pressure plate having a plurality of centering means for retaining and spacing a plurality of springs in the cap body and in position to force a depending valve cage downwardly with respect to the cap body.

Still another feature of the invention relates to the provision of a slidable valve cage depending from and carried by an outer cap body and which at its bottom end has mounted on its lower end a gasket for closing the pressure relief valve opening as well as a vacuum relief valve centrally of and operable independently of the pressure relief valve.

Other objects and features of the invention will more fully appear from the following detailed description taken in connection with the accompanying drawings which illustrate a single embodiment thereof and in which:

Figure 1 is a fragmentary vertical sectional view through a radiator cap assembly of my invention showing it applied to a neck on a radiator;

Figure 2 is a cross-sectional view taken on the line II—II of Figure 1, looking downwardly;

Figure 3 is an exploded view, partly in section and partly in elevation, showing the various parts which go to make up my novel pressure cap; and Figure 4 is a view taken on the line IV—IV of Figure 1, looking downwardly and showing the detachable locking connection between the cap and the radiator neck.

As shown on the drawings:

The reference character 10 designates generally a dished metallic stamping having projecting from its edge a pair of diametrically opposite ears 11—11, adapted to be turned radially inward as shown in Figure 1 in the assembly of the parts and to serve as the locking ears for detachably locking the cap to the radiator neck, which is designated generally by the reference character 12 (Figure 1).

The cap body or shell 10 has a central protuberance 13 in which is adapted to nest a similar protuberance 15 on the spring pressure and retaining plate 14 (Fig. 3). This plate 14 has formed on its under side a plurality of substantially spaced bosses or teats 16, each of which is adapted to telescope the upper end of a spring 17. The springs may be of any suitable number necessary for applying the requisite spring pressure, although for purposes of illustration, I have shown six of them (Fig. 2).

Depending from and supported by the cap body 10 is a valve cage 18 the main part of which is a dished stamping. The outer or upper extremity of this stamping has a flange 19 which carries a plurality of spaced bosses or teats, each of which is adapted to telescope the lower end of a spring 17. In other words, the bosses 20 are adapted to be aligned with the bosses 16 when the parts are assembled together so that the two sets of bosses will cooperate in centering and retaining the springs in position inside of the cap body 10.

The cage flange 19 has a turned edge 21 which is engaged by the turned ears 11—11 of the cap body 10 when the parts are assembled together. In fact these ears serve as the sole means for molding the parts together. It will further be appreciated that it is easy to assemble the parts and to interlock them together by merely turning the ears 11 radially inwardly under the edge 21. Similarly, if it is desired to disassemble the parts, the same may be effected by merely turning out the ears 11.

In addition to retaining the parts together, these ears serve as locking tabs for engaging under the turned edge 22 of a flange 23 on the upper end of the radiator neck 12 (Fig. 1). This flange has opposite slots 24 through which the ears may pass as the cap is pressed downwardly onto the neck and whereby upon turning of the cap the ears can be brought into locking engagement with the edge 22 of the neck flange 23 (Fig. 4).

It is, of course, to be understood that the neck flange 23, as it is conventional in the automobile art, is a part of the radiator 25. In fact the lower end of the neck 12 cooperates with the radiator to form an annular shoulder 26 which defines the radiator filler opening and also defines a seat for engagement by a closure gasket 27 on the lower end of the shell 18. In reality I propose, in accordance with the features of this invention, to use this closure gasket 27 on the depending cage 18 to sealingly close the filler opening and to also serve as a part of the pressure relief valve as I shall describe more fully hereinafter.

It should be noted that the neck 12 has the usual overflow opening 28 and that the cage 18 is provided with a vent opening 29 so that the exterior of the cage is in communication with the atmosphere through the overflow opening 28.

The inner or lower end of the depending cage 18 has a shouldered flange 30 in which is, tightly, seated said gasket 27. The gasket 27 may have an annular retaining or locking ring 31 of a smaller diameter than the gasket so that the peripheral portion of the gasket is free for yieldable engagement with the inner neck shoulder 26.

The center of the lower or inner end of the cage 18, is provided with a frusto-conical valve seat 32 which defines a central vacuum relief valve opening normally closed by the frusto-conical lower end 33 by a valve closure element 34. The shank of this element has its end bifurcated to provide lateral spring retaining ears 35—35. Surrounding the valve shank is a helical coil spring 36, one end of which bears against the upper side of the frusto-conical valve seat 32 and the other end of which engages the ears 35. In this way the spring is at all times urging the valve head 33 against the seat 32.

Now the tension of the spring 36 is predetermined so that when a vacuum or a sub-atmospheric condition occurs in the radiator, the atmospheric pressure acting on the valve becomes effective to unseat the valve and thereby eliminate the vacuum.

Also when my radiator valve is in the locked position shown in Figure 1, the vacuum relief valve is closed and the springs 17 force the cage 18 downward and the gasket 27 into sealing engagement with the shoulder 26. The pressure of these springs 17 is so calculated that upon the pressure of the fluid in the radiator reaching a certain point, that pressure can overcome the springs and raise the cage and its gasket off the shoulder or seat 26 thereby relieving the pressure; any fluid escaping past the gasket 27 having an exit through the overflow opening 28.

In the foregoing manner I use the filler opening sealing gasket to serve the purpose of a pressure relief valve since upon its displacement excessive fluid pressure is vented from the radiator. This pressure relief valve, however, functions entirely independently of the vacuum relief valve 33.

Of course it follows that by reason of my using a filler opening sealing gasket 27 as a pressure relief member, I am enabled to reduce the number of parts in the cap and thereby make it simpler and cheaper to manufacture.

Attention is also directed to the fact that the pressure exerted by the compression coil spring 17 may be very easily changed by changing the spacing between the bosses 16 and 20. One way of doing this is to change the size of the protuberance 15 on the plate so that the spacing between the plate 14 and the top of the cap body 10 is varied.

In manufacturing these caps all that is necessary in order to provide the caps responsive to different pressures is to carry in stock plates like the plate 14 with different sizes of protuberances 15.

In addition the springs 17 serve the double function of forcing the gasket 27 against the shoulder 26 and of also forcing the locking ears 11 against the edge 22 of the neck flange 23.

I claim as my invention:

1. In a radiator cap assembly including an outer, dished cap body for detachable locking engagement with a radiator neck having a shoulder on its inner end defining a filler opening which also serves as a pressure relief valve opening, a hollow valve cage depending from said outer cap body for telescoping the radiator neck and comprising a shell dished in the opposite direction from the outer cap with a turned annular bottom flange at its inner end defining at its center a vacuum relief valve opening and supporting a spring urged valve closure in said opening normally in closed position, but automatically movable to open position in response to vacuum in the radiator, said flange having a portion radially outwardly extending and said valve cage being provided with a closure ring independent of the vacuum relief valve for yieldable and slidable cooperation with said neck shoulder to close the pressure relief valve opening when the cap is locked to said neck, said closure ring when seated also sealing the filler opening of said neck, and spring means bearing on the outer and upper end of the valve cage inside of the cap body for forcing said cap and its closure ring yieldably against said neck shoulder and independently of the central vacuum relief valve closure and means integral with said cap body for attaching the outer and upper end of the valve cage to the cap body.

2. In a radiator cap for detachable use with a neck of a radiator which includes an outer flange for detachable latching engagement by the cap and an inner filler opening shoulder for sealing cooperation with the cap and defining a filler opening when the cap is removed and a pressure relief valve opening when the cap is in use, said cap comprising an outer dished cap body element having means for detachable locking engagement with the neck flange, an inner element dished in an opposite direction from that of said outer cap element for telescoping said neck and having at its dished inner end a valve flange for yieldable sealing engagement with said inner neck shoulder as well as a vacuum relief valve for controlling the flow of air into the radiator, said inner element having at its outer end a flange extending into said outer cap element and slidably supported therein, spring means in said outer cap element engaging the outer end of said inner dished element for yieldably forcing its inner flange into sealing engagement with said neck shoulder when the cap is locked to the neck for yieldably closing said pressure relief valve opening and a spring equalizing plate between said springs and the outer cap body element.

3. The radiator cap construction of claim 2 further characterized by the spring means comprising a plurality of substantially spaced spring elements carried and engaged by said flange at the outer end of said inner dished element.

4. The radiator cap construction of claim 2 further characterized by said spring means comprising a plurality of substantially spaced spring elements carried and engaged by said flange at the outer end of said inner dished element, and said equalizing plate comprising a pressure and spring centering plate inside the cap and universally pivotally supported about the center thereof and against which the upper ends of said spring elements bear.

5. The radiator cap construction of claim 2 further characterized by the cap having spaced inwardly turned ears for detachable locking engagement with the neck and which also engage and hold the shell in an assembled relation with the cap body.

ANTON W. KONCHAN.

References Cited in the file of this patent

UNITED STATES PATENTS

| Number | Name | Date |
|---|---|---|
| 2,006,752 | Swank | July 2, 1935 |
| 2,164,450 | Eshbaugh et al. | July 4, 1939 |
| 2,203,801 | Swank | June 11, 1940 |
| 2,266,314 | Eshbaugh | Dec. 16, 1941 |
| 2,271,918 | Glowka | Feb. 3, 1942 |
| 2,311,971 | Shaw | Feb. 23, 1943 |
| 2,521,201 | Clark et al. | Sept. 5, 1950 |

FOREIGN PATENTS

| Number | Country | Date |
|---|---|---|
| 550,897 | Germany | May 21, 1932 |